(No Model.)
W. WILLIAMSON.
GRAIN CLEANER.
No. 251,984. Patented Jan. 3, 1882.
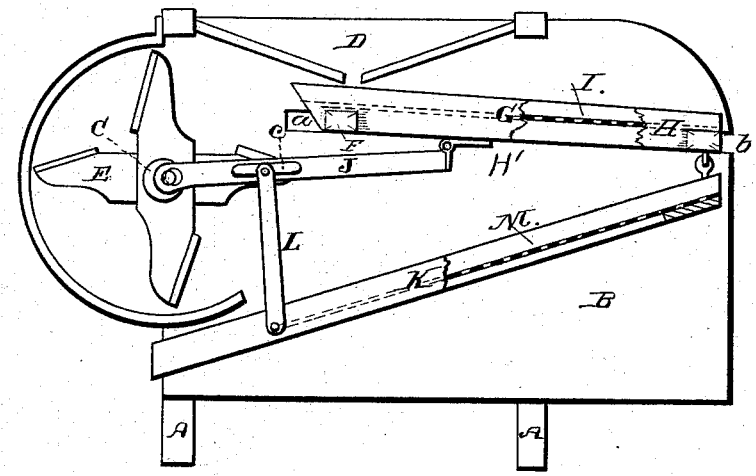
Witnesses,
Geo. H. Strong.
O. H. Strouse.
Inventor,
Wm Williamson
By Dewey & Co.
Atty's

UNITED STATES PATENT OFFICE.

WILLIAM WILLIAMSON, OF RIO VISTA, CALIFORNIA.

GRAIN-CLEANER.

SPECIFICATION forming part of Letters Patent No. 251,984, dated January 3, 1882.

Application filed June 22, 1881. (No model.)

*To all whom it may concern:*

Be it known that I, WILLIAM WILLIAMSON, of Rio Vista, county of Solano, State of California, have invented an Improved Grain-Cleaner; and I hereby declare the following to be a full, clear, and exact description thereof.

My invention relates to that class of agricultural implements known as "grain-cleaners," in which the grain is received upon shaking-screens and subjected to the action of a blast of air from a revolving fan.

It consists in such a construction of the screen-containing shoe and the means for operating it as will impart to the screens a peculiar movement, all of which will hereinafter more fully appear.

Referring to the accompanying drawing, the figure is a side elevation of the mechanism.

I will here describe the invention as being a separate and entire device in itself, though it may be applied to the frame of thrashers and other grain separators and cleaners.

A represents a frame having side boards, B, and a feeding-hopper, D, in its top. Journaled in the frame is a shaft, C, carrying a fan, E, operated by the shaft by means of any suitable power.

In the side boards, B, are slots a, in which a cross-head, F, fits. This cross-head has extended side pieces, G, passing just inside the side boards, B, in a direction opposite the fan, to the end which I here call the "rear" of the machine. The side pieces, G, are secured to another cross-piece, H, the ends of which rest within slots or grooves b in the rear ends of the side boards. By these means the pieces F, G, and H are supported and can be moved back and forth in a direct line. The side pieces, G, are inclined downwardly toward the rear somewhat. They form together a support or shoe for the upper screen or sieve, I.

J J are connecting-rods, the forward ends of which are journaled upon eccentrics upon the fan-shaft C, so that when said shaft is revolved the rods J will be thrown forward and back. Their rear ends are hinged to the upper shoe at H', and through them the upper screen, I, is given a motion back and forth in a straight line.

The pieces K, forming the shoe for the screen M, are attached at a point a little forward of their centers to the rods J by means of strips L on each side.

Now, the motion of the screens will be thus: Upon turning the fan-shaft the connecting-rods J, being eccentrically journaled, have a forward and return throw, and their rear ends, being hinged to the shoe of the upper sieve, I, communicate motion to said shoe, and this motion, on account of the shoe being guided in straight slots in the side boards, is a forward and return movement in a straight line. At the same time the lower shoe, containing the sieve M, being hinged to the end of the upper shoe, is moved back and forth; but being connected with the rods near their eccentrically-journaled ends, another movement is given to it—namely, an upward or tossing motion.

I am aware that imparting a tossing or sudden upward shake to sieves and screens is not new, and that the movement in a straight line is well known.

The straw and grain are fed in through the hopper D and fall upon the upper screen or sieve, I. I have found it best at this stage to give to this screen a straight movement, which has a better effect upon the straw in connection with the blast from the fan than any kind of tossing movement. It slides the straw and chaff off without shaking them and causing them to become clogged in the sieve, which would be likely to occur if it were given a shaking movement up and down. The object here is to cause the straw and chaff to travel off, not to shake them through the screen. The grain passes through the screen I and falls upon the lower screen, M. Here the double motion of said screen causes the smaller grain to sift through and the larger grain to move forward to the discharge.

In order to change the upward motion of the lower screen and adjust it, I hinge the rods J to the upper shoe near their centers and connect the rear ends of both shoes, as shown in the figure. A slot, c, is made in the connecting-rods J, and the side strips, L, are hinged to the lower shoe, their upper ends being fitted and secured in the slots c, so that they may be moved closer to or farther from the eccentrics. By moving them closer and securing them the lower shoe is given a greater upward movement, and the reverse.

Having thus described my invention, what I claim as new, and desire to secure by Letters Patent, is—

In a grain-cleaner having a revolving fan-shaft, the combination of the upper shoe having screen I, lower shoe having screen M, eccentrically-journaled rods J, having slots $c$, and hinged adjustable connecting-strips L, arranged substantially as and for the purpose herein described.

In witness whereof I have hereunto set my hand.

WM. WILLIAMSON.

Witnesses:
S. H. NOURSE,
JEROME F. KENDELL.